(12) United States Patent
Bharghavan et al.

(10) Patent No.: US 7,894,436 B1
(45) Date of Patent: Feb. 22, 2011

(54) FLOW INSPECTION

(75) Inventors: Vaduvur Bharghavan, Morgan Hill, CA (US); Shishir Varma, Bangalore (IN); Sung-Wook Han, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 497 days.

(21) Appl. No.: 11/899,998

(22) Filed: Sep. 7, 2007

(51) Int. Cl.
*H04L 12/28* (2006.01)
*G06F 15/173* (2006.01)

(52) U.S. Cl. ....................... 370/392; 709/224
(58) Field of Classification Search ........ None
See application file for complete search history.

(56) References Cited

U.S. PATENT DOCUMENTS

| | | | |
|---|---|---|---|
| 6,557,112 B1 * | 4/2003 | Shimada | 714/4 |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,954,177 B2 | 10/2005 | Channabasappa et al. | |
| 2007/0011317 A1 * | 1/2007 | Brandyburg et al. | 709/224 |
| 2007/0121596 A1 * | 5/2007 | Kurapati et al. | 370/356 |

* cited by examiner

*Primary Examiner*—Gregory B Sefcheck
*Assistant Examiner*—Nima Mahmoudzadeh
(74) *Attorney, Agent, or Firm*—Swernofsky Law Group PC

(57) ABSTRACT

A communication system detects particular application protocols in response to their message traffic patterns, which might be responsive to packet size, average packet rate, burstiness of packet transmissions, or other message pattern features. Selected message pattern features include average packet rate, maximum packet burst, maximum future accumulation, minimum packet size, and maximum packet size. The system maintains a counter of packet tokens, each arriving at a constant rate, and maintains a queue of real packets. Each real packet is released from the queue when there is a corresponding packet token also available for release. Packet tokens overfilling the counter, and real packets overfilling the queue, are discarded. Users might add or alter application protocol descriptions to account for profiles thereof.

81 Claims, 2 Drawing Sheets

FLOW INSPECTION

BACKGROUND

Figure 1:
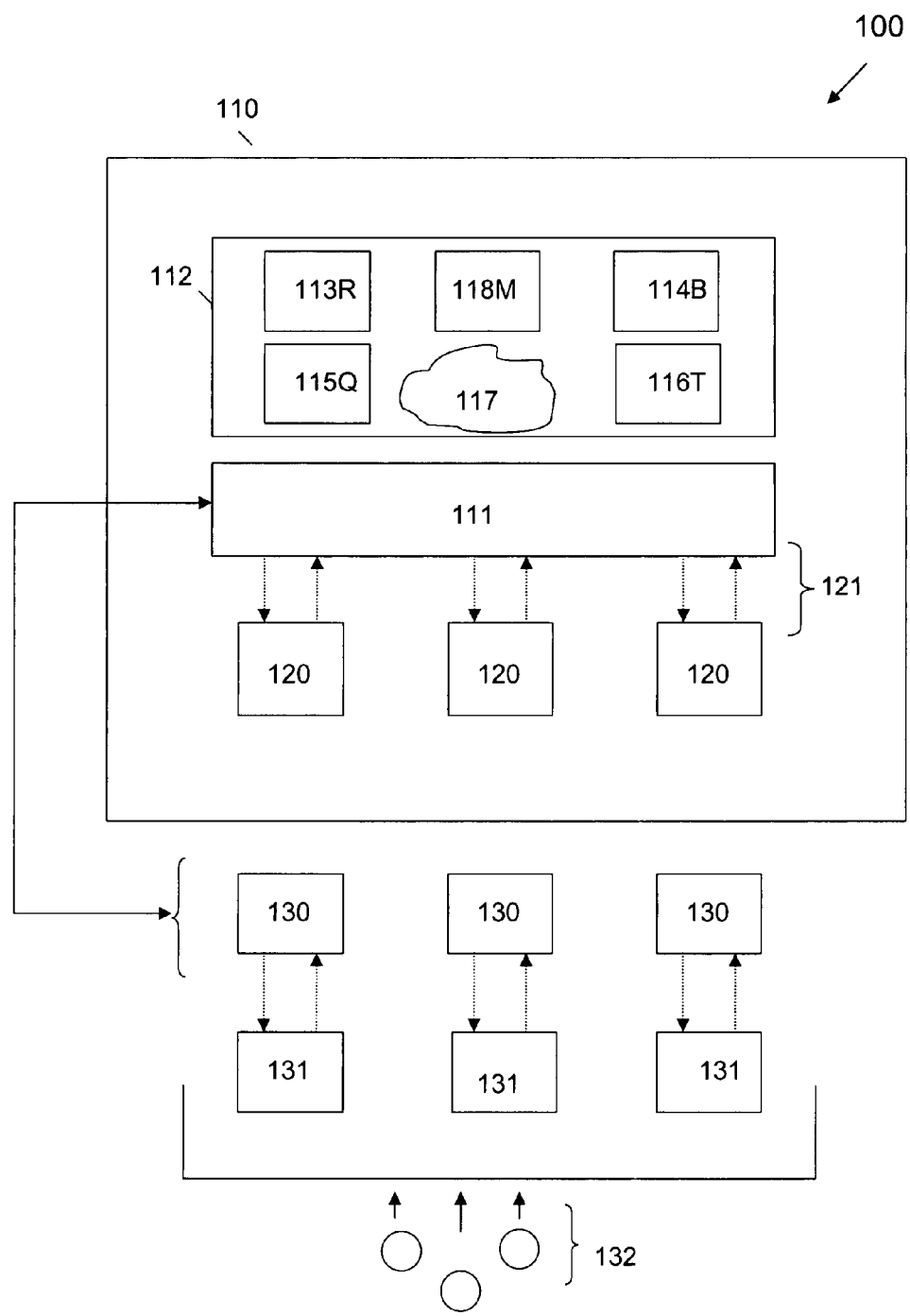

In communication networks, it is sometimes advantageous to recognize and specially treat messages including selected application protocols. Many communication networks use a multi-level protocol schema, in which more sophisticated protocols are carried as payload information for less sophisticated protocols. One such multi-level protocol schema is the OSI/ISO model, including distinct protocol levels from level 1 through level 7 inclusive.

One problem in the known art is that it is sometimes difficult to recognize those protocols carried as payload information (level 7 protocols in the OSI/ISO model). They can be difficult to recognize in part because such recognition involves decoding each succeeding level of application protocol, with the intent of detecting the particular level 7 protocol desired to be detected. They can also be difficult to recognize in part because those application protocols might be encrypted, with the intent of preventing outsiders to the protocol communication from reading or even detecting the use of that particular application protocol. They can also be difficult to recognize in part because the application protocols, even if unencrypted, may not be known to the communication network, and can therefore not be parsed as messages traverse the network.

One known method for detecting particular application protocols is to attempt "deep packet" inspection of some or all message packets, with the intent of detecting content believed to be characteristic of the particular application protocol desired to be detected. While this method might have some value in detecting particular application protocols when those application protocols are (1) relatively easy to decode, (2) unencrypted, and (3) understood by the communication network, it is subject to drawbacks when those conditions do not obtain.

DESCRIPTION OF THE EMBODIMENT

Nature of the Description

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to $1^{st}$ contemplated causes or effects for some implementations do not preclude other causes or effects that might occur in other implementations, even if completely contrary, where circumstances would indicate that the $1^{st}$ contemplated causes or effects would not be as determinative of the structures or techniques to be selected for actual use.

References to $1^{st}$ reasons for using particular structures or techniques do not preclude other reasons or other structures or techniques, even if completely contrary, where circumstances would indicate that the $1^{st}$ structures or techniques are not as compelling. The invention includes those other reasons or other structures or techniques, especially where circumstances would indicate they would achieve the same effect or purpose as the $1^{st}$ reasons, structures, or techniques.

OVERVIEW OF THE DESCRIPTION

A communication system detects particular application protocols in response to their message traffic patterns. Traffic patterns might be responsive to packet size, average packet rate, burstiness of packet transmissions, and possibly other message pattern features. In one embodiment, the communication system might apply administrative rules to messages detected as being within those particular application protocols. For example, the communication system might apply administrative rules to ban Skype traffic, or to limit its use during business hours, or apply other and further types of restrictions.

In one embodiment, a system maintains values for average packet rate (R), maximum packet burst (B), maximum future accumulation (Q), minimum packet size (MIN), a maximum packet size (MAX), a minimum packet bound (MIN2), a maximum packet bound (MAX2), and a time interval (TI). A message traffic pattern is defined as a stream of packets that conform to packet size specifications.

In one embodiment, every packet that is between the lower and upper bounds of MIN2 and MAX2 respectively, is designated to belong to the message traffic pattern so long as there was at least one packet within the lower and upper bounds of MIN and MAX that arrived at the communication system within a previous time interval of TI. Other and further techniques for identifying packets as being within the message traffic pattern would also be workable, and are within the scope and spirit of the invention.

This has the effect of identifying message traffic patterns, and therefore particular application protocols, in response to several factors, including: average packet rate, burstiness, and packet size. Once the medication system is capable of identifying message traffic patterns, and therefore particular application protocols, it may decide what treatment to accord messages so identified.

The system maintains a B-size counter of packet tokens, each arriving at a constant rate R, i.e., one arriving each 1/R time units. It is also possible to generate the tokens arriving according to a distribution function different from constant arrival, but with an average rate R. For example, a distribution function such as a Poisson arrival time, a Bernoulli arrival time, or some other distribution function, would also work, and is within the scope and spirit of the invention.

The system also maintains a Q-size queue of real packets, i.e., each maintaining a real packet that arrives and is designated as part of the message traffic pattern according to the packet size specification described above. Each real packet is released from the queue when there is a corresponding packet token also available for release. Packet tokens overfilling the B-size counter, and real packets overfilling the Q-size queue, are discarded.

In alternative embodiments, there may be other mappings between packets and tokens, the one-for-one mapping between packets and tokens being only a specific instance. Some examples of alternative mappings include:

A mapping between packets and tokens that takes into account an amount of time it would take to transmit each packet, and consumes a number of tokens in response to that amount of time. In a simple example of such embodiments, the number of tokens consumed is a linear function of that amount of time. This approach allows for a "time based", as opposed to a "packet based", method of control of message traffic patterns.

A mapping between packets and tokens that takes into account a size of each packet in bits, and consumes a number of tokens in response to that size in bits. In a simple example of such embodiments, the number of tokens consumed is a linear function of that size in bits. This approach allows for a "bit-rate based", as opposed to a "packet based", method of control of message traffic patterns.

In one embodiment, the system includes a set of selected descriptions, using these values, for each particular application level protocol. Administrators and other users of the system might add or alter those descriptions to account for perceived profiles of application protocols, or to account for new particular application protocols of interest. In general, descriptions will include minimum values for R, B, Q, and specified bounds for MIN, MAX, MIN2, MAX2, and TI.

after reading this application, those skilled in the art will recognize that this technique, or similar techniques, for identifying message traffic patterns and therefore particular application protocols, might be combined with other and further techniques, such as deep packet inspection or other techniques for identifying particular application protocols.

Terms and Phrases

Read this application with the following terms and phrases in their most general form. The general meaning of each of these terms or phrases is illustrative, not in any way limiting.

The phrase "application protocol", and variants thereof, generally refers to any protocol capable of being payload data in another protocol.

Although this application provides greater detail regarding embodiments in which application protocols are included in level 7 of the OSI/ISO model, there is no particular reason to limit any part of this application in this regard.

The phrase "multi-level protocol schema", and variants thereof, generally refers to any technique by which application protocols are capable of being embedded in other protocols.

Although this application provides greater detail regarding embodiments in which the multi-level protocol schema includes the OSI/ISO model, there is no particular reason to limit any part of this application in this regard.

The phrase "message traffic pattern", and variants thereof, generally refers to any technique by which an application protocol is capable of being identified without review of its payload data, conformance to packet size bounds being one such technique.

Although this application provides greater detail regarding embodiments in which message traffic patterns are responsive to particular named message pattern features, there is no particular reason to limit any part of this application in this regard.

The phrase "message pattern feature", and variants thereof, generally refers to any aspect of message traffic identifiable by an external device not privy to the content of those messages.

Although this application provides greater detail regarding embodiments in which particular message pattern features are selected for use, there is no particular reason to limit any part of this application in this regard.

Although this application provides greater detail regarding embodiments in which message pattern features including packet size, average packet rate, and burstiness of packet transmissions, are selected for use, there is no particular reason to limit any part of this application in this regard.

Although this application provides greater detail regarding embodiments in which particular application protocols are detected in response to the following particular values:

. . . average packet rate (R),
. . . maximum packet burst (B),
. . . maximum future accumulation (Q),
. . . minimum packet size (MIN),
. . . maximum packet size (MAX),
. . . minimum packet bound [MIN2],
. . . maximum packet bound [MAX2],
. . . time interval [TI], there is no particular reason to limit any part of this application in this regard.

The term "packet", and variants thereof, generally refers to any message capable of being sent from one device to one or more destination devices.

Although this application provides greater detail regarding embodiments in which packets primarily act according to an IEEE 802 protocol variant, there is no particular reason to limit any part of this application in this regard.

Figures and Text

FIG. 1

A FIG. 1 shows a block diagram of a system.

A system 100 includes elements as represented in the FIG. 1, including at least: a computing device 110, one or more I/O ports 120, and one or more administrative ports 130.

The computing device 110 includes elements as represented in the FIG. 1, including at least: a processor 111, a set of operating memory (or mass storage) 112. The processor 111 operates under control of instructions maintained in the memory 112, and performs its operations on data maintained in the memory 112.

The operating memory 112 includes elements as represented in the FIG. 1, including at least: a data element representing an average packet rate 113 R, a data element representing a maximum burstiness 114 B, a data element representing a maximum accumulation queue value 115 Q, data element representing a token counter 116 T, a packet transfer queue 117, and a data element representing the message traffic pattern element 118 M.

The one or more I/O ports 120 are disposed to receive and/or send messages 121, e.g., packets. The processor 111 reads messages 121 from the I/O ports 120 when those messages 121 are to be input and writes messages 121 to the I/O ports 120 when those messages 121 are to be output.

The one or more administrative ports 130 are disposed to provide status information to, and receive instructions from, one or more administrative work stations 131, the latter being under the control of one or more users 132. Users 132 need not be specific human beings. They might be control programs operating at logically remote devices. They might be groups of users 132 collectively having the authority to provide status information and receive instructions. They need not be situated physically local to any particular device.

The processor 111 provides status information to the administrative ports 130, with the effect of providing information to the administrative workstations 131 and the users 132, upon requests directed to the processor 111 from those users 132.

The processor 111 receives and acts upon instructions from the administrative ports 130, with the effect of operating under the control of the users 132, upon requests directed to the processor 111 from those users 132.

Among instructions the users 132 might direct to the processor 111 are to:

- alter or add to parameters representing profiles identifying application protocols;
- identify new application protocols, including designating parameters representing profiles identifying those new application protocols.

Figure 2:
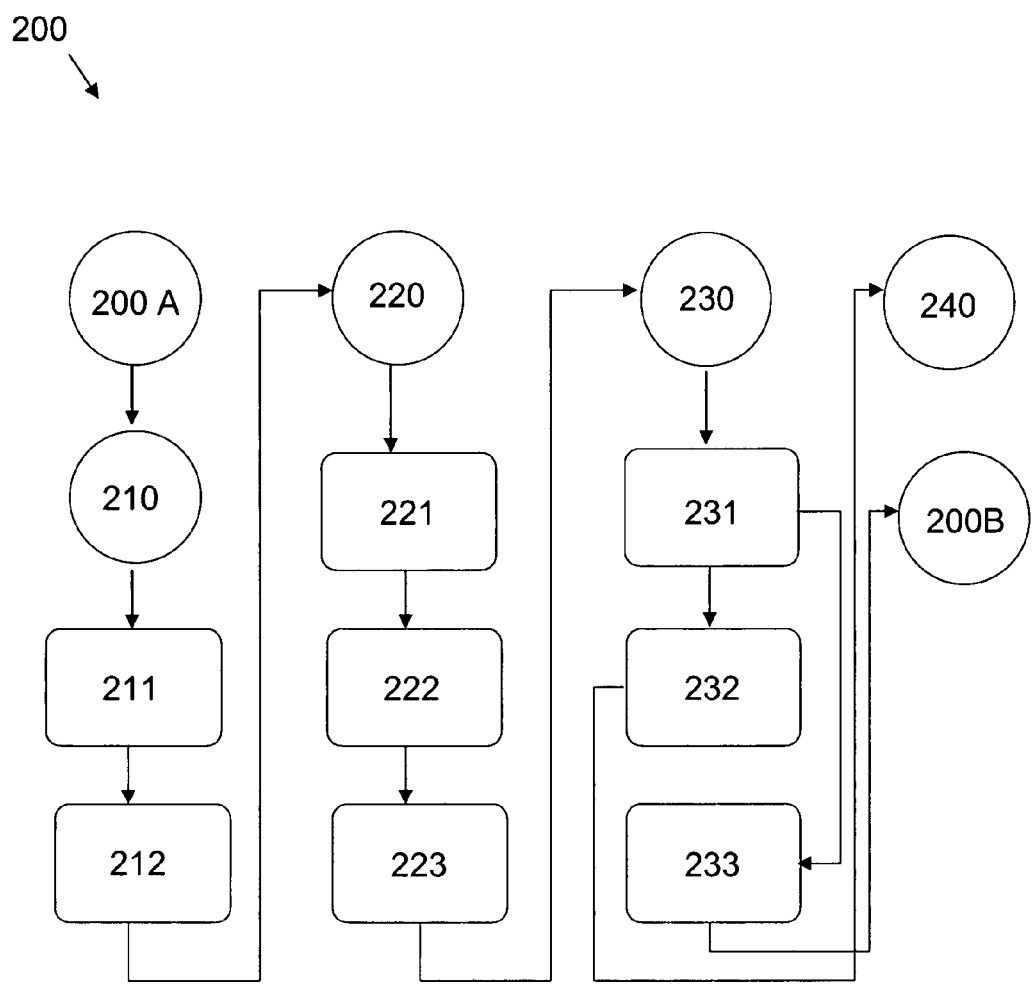

Operation of the system is described in other and further detail with respect to FIG. 2.

FIG. 2

A FIG. 2 shows a process diagram of a method.

The steps following each of the labels described with respect to the method 200 might be performed concurrently, in parallel, pipelined, or otherwise using multiple computing devices, with steps following some flow points being performed for newer data while steps following other flow points are performed for earlier data.

A method 200 includes labels and process steps as represented in the FIG. 2, including at least the following:

Beginning of Method

A label 200A indicates a beginning of the method 200.

The method proceeds with a label 210.

Token Counting

A label 210 indicates that the method 200 is ready to count tokens.

At a step 211, the processor 111 notes the passage of a defined time duration, equal to a time in which one packet is expected to arrive, on average. This has the effect that if the average packet rate 113 parameter equals R, the processor 111 will note the passage of such time each 1/R time units.

At a step 212, the processor 111 increments the token counter 116 T according to the packet-to-token mapping, unless the token counter 116 T would exceed the maximum burstiness 114 value B as a consequence. In the latter case, the processor 111 sets (or maintains) the token counter 116 T at the maximum burstiness 114 value B.

The method proceeds with a label 220.

Packet Arrival

A label 220 indicates that the method 200 is ready to receive packets.

At a step 221, a packet arrives at an I/O port 120.

At a step 222, the processor reads the packet from the I/O port 120.

At a step 223, the processor appends the packet to the packet transfer queue 117 if the packet conforms to the message traffic pattern 118 M.

The method proceeds with a label 230.

Packet Release

A label 230 indicates that the method 200 is ready to release packets.

At a step 231, the processor 111 compares the token counter 116 T with a minimum value, in one embodiment, zero.

If the token counter 116 T exceeds its minimum value, i.e., the token counter 116 T is positive, the method 200 proceeds with the step 232, with the effect that the processor 111 releases packets.

If the token counter 116 T does not exceed its minimum value, i.e., the token counter 116 T is zero, the method 200 skips the step 232 and proceeds with the step 233, with the effect that the processor 111 does not release any packets.

At a step 232, the processor 111 decrements the token counter 116T. In one embodiment, the processor 111 decrements the token counter 116 T by one for each packet to be released. In alternative embodiments, the processor 111 may decrement the token counter 116 T by an amount corresponding to the size of each packet to be released. Upon decrementing the token counter 116 T, the processor 111 removes the selected number of packets from the packet transfer queue 117 and sends them to one or more of the I/O ports 120.

The method 200 proceeds with the label 240.

At a step 233, the processor 111 determines if the packet transfer queue 117 is full, i.e., if there are already the maximum number of packets in the packet transfer queue 117 equal to the maximum accumulation queue value 115 Q.

If the packet transfer queue 117 is full, the processor 111 discards the packet. This has the effect that the packet transfer queue 117 remains full.

If the packet transfer queue 117 is not full, the processor 111 maintains the packet in the packet transfer queue 117. This has the effect of increasing the fullness of the packet transfer queue 117.

The method 200 proceeds with the label 200B.

End of Method

A label 200B indicates an end of the method 200.

Alternative Embodiments

After reading this application, those skilled in the art will recognize that the invention has wide applicability, and is not limited to the embodiments described herein.

The invention claimed is:

1. A method, including steps of
determining a set of message pattern features;
detecting one or more application protocols in response to those message pattern features;
treating one or more packets included in those application protocols in response to those steps of detecting; and
detecting more and more application protocols in response to inspection of packets; and wherein those steps of treating are responsive to those steps of detecting in response to inspection of packets;
wherein those steps of detecting include steps of
first maintaining a counter of messages expected to arrive within a first known time duration;
second maintaining a set of messages actually arriving within a second known time duration, that second known time duration being responsive to that first known time duration; and
comparing a result of those steps of first maintaining with a result of those steps of second maintaining
wherein those steps of first maintaining include steps of
increasing that counter according to a selected distribution, between first selected minimum and maximum counter values; and
decreasing that counter each time a message is released from a queue, between second selected minimum and maximum counter values;
wherein those steps of decreasing that counter include a selected mapping between those steps of increasing and those steps of decreasing.

2. A method as in claim 1, wherein that set of message pattern features includes at least one of: rate, burstiness, accumulation, size parameters.

3. A method as in claim 1, wherein those steps of detecting include steps of
identifying whether message traffic adheres to a selected set of message pattern features;
indicating whether one or more packets are included in a set of particular application protocols, in response to at least one result of those steps of identifying.

4. A method as in claim 1, wherein those steps of detecting include steps of
   identifying whether message traffic adheres to a selected set of message pattern features;
   indicating whether one or more packets are not included in a set of particular application protocols, in response to at least one result of those steps of identifying.

5. A method as in 1, wherein those steps of comparing include steps of matching a first number of those counters with a second number of those messages.

6. A method as in claim 1, wherein those steps of comparing include steps of releasing those messages in response to receipt of a number of those counters.

7. A method as in claim 1, wherein that selected mapping between those steps of increasing and those steps of decreasing includes a one-to-one mapping between incoming tokens and released packets.

8. A method as in claim 1, wherein that selected mapping between those steps of increasing and those steps of decreasing includes a mapping between incoming tokens and released packets that is responsive to an amount of time it would take to transmit each such packet.

9. A method as in claim 1, wherein that selected mapping between those steps of increasing and those steps of decreasing includes a mapping between incoming tokens and released packets that is responsive to a linear function of an amount of time it would take to transmit each such packet.

10. A method as in claim 1, wherein that selected mapping between those steps of increasing and those steps of decreasing includes a mapping between incoming tokens and released packets that is responsive to a size of each such packet.

11. A method as in claim 1, wherein that selected mapping between those steps of increasing and those steps of decreasing includes a mapping between incoming tokens and released packets that is responsive to a linear function of a size of each such packet.

12. A method as in claim 1, wherein that selected distribution includes a constant rate per unit time.

13. A method as in claim 1, wherein that selected distribution includes a inconstant rate per unit time, averaging a selected rate per unit time.

14. A method as in claim 1, wherein that selected distribution includes at least one of: a Poisson arrival distribution, a Bernoulli arrival distribution, another nonlinear arrival distribution.

15. A method as in claim 1, wherein those first and second selected
   counter values are identical.

16. A method as in claim 1, wherein those selected maximum counter values axe finite.

17. A method as in claim 1, wherein those selected minimum counter values axe nonnegative.

18. A method as in claim 1, wherein those steps of second maintaining include steps of
   adding messages to that set upon arrival; removing messages from that set upon release; and
   removing messages from that set upon exceeding a selected maximum number of messages.

19. A method as in claim 18, wherein that selected maximum number of messages is finite.

20. A method as in claim 1, wherein those steps of treating include steps of applying distinct rules to messages in response to those steps of detecting.

21. A method as in claim 20, wherein those steps of treating include steps of discarding packets detected to be included in selected particular application protocols.

22. A method as in claim 20, wherein those steps of treating include steps of discarding packets detected to not be included in selected particular application protocols.

23. A method as in claim 1, wherein those steps of treating include steps of
   identifying packets between a first set of size bounds as belonging to an identified message traffic pattern,
   so long as a selected number of packets between a second set of size bounds arrived with a selected previous time interval.

24. A method as in claim 23, wherein at least one of those first set of size bounds, second set of size bounds, are constant.

25. A method as in claim 23, wherein at least one of those first set of size bounds, second set of size bounds, are time-varying.

26. A method as in claim 23, wherein that selected previous time interval is constant.

27. A method as in claim 23, wherein that selected previous time interval is substantially time-varying.

28. A physical non-transitory medium including information interpretable by a computing device, the information including
   instructions determining a set of message pattern features;
   instructions detecting one or more application protocols in response to those message pattern features;
   instructions treating one or more packets included in those application protocols in response to those instructions detecting,
   instructions detecting more and more application protocols in response to inspection of packets; and
   and wherein those instructions treating are responsive to those instructions detecting in response to inspection of packets;
   wherein those instructions detecting include information interpretable by a computing device, the information including
   instructions first maintaining a counter of messages expected to arrive within a first known time duration;
   instructions second maintaining a set of messages actually arriving with\-in a second known time duration, that second known time duration being responsive to that first known time duration; and
   instructions comparing a result of those instructions first maintaining with a result of those instructions second maintaining;
   wherein those instructions first maintaining include information interpretable by a computing device, the information including
   instructions increasing that counter according to a selected distribution, between first selected minimum and maximum counter values; and
   instructions decreasing that counter each time a message is released from that queue, between second selected minimum and maximum counter values;
   wherein those instructions de\-creasing that counter include a selected mapping between increasing and decreasing.

29. A physical medium as in claim 28, wherein that set of message pattern features includes at least one of: rate, burstiness, accumulation, size parameters.

30. A physical medium as in claim 28, wherein those instructions detecting include information interpretable by a computing device, the information including
   instructions identifying whether message traffic adheres to a selected set of message pattern features;

instructions indicating whether one or more packets are included in a set of particular application protocols, in response to those instructions identifying.

31. A physical medium as in 28, wherein those instructions detecting include information interpretable by a computing device, the information including
    instructions identifying whether message traffic adheres to a selected set of message pattern features;
    instructions indicating whether one or more packets are not included in a set of particular application protocols, in response to those instructions identifying.

32. A physical non-transitory medium as in claim 28, wherein those instructions comparing include information interpretable by a computing device, the information including instructions matching a first number of those counters with a second number of those messages.

33. A physical non-transitory medium as in claim 28, wherein those instructions comparing include information interpretable by a computing device, the information including instructions releasing those messages in response to receipt of a number of those counters.

34. A physical non-transitory medium as in claim 28, wherein that selected mapping between increasing and decreasing includes a one-to-one mapping between incoming tokens and released packets.

35. A physical non-transitory medium as in claim 28, wherein that selected mapping between increasing and decreasing includes a mapping between incoming tokens and released packets that is responsive to an amount of time it would take to transmit each such packet.

36. A physical non-transitory medium as in claim 28, wherein that selected mapping between increasing and decreasing includes a mapping between incoming tokens and released packets that is responsive to a linear function of an amount of time it would take to transmit each such packet.

37. A physical non-transitory medium as in claim 28, wherein that selected mapping between increasing and decreasing includes a mapping between incoming tokens and released packets that is responsive to a size of each such packet.

38. A physical non-transitory medium as in claim 28, wherein that selected mapping between increasing and decreasing includes a mapping between incoming tokens and released packets that is responsive to a linear function of a size of each such packet.

39. A physical non-transitory medium as in claim 28, wherein that selected distribution includes a substantially constant rate per unit time.

40. A physical non-transitory medium as in 28, wherein that selected distribution includes a inconstant rate per unit time, averaging a selected rate per unit time.

41. A physical non-transitory medium as in claim 28, wherein that selected distribution includes at least one of a Poisson arrival distribution, a Bernoulli arrival distribution, another nonlinear arrival distribution.

42. A physical non-transitory medium as in claim 28, wherein those first and second selected counter values are substantially identical.

43. A physical non-transitory medium as in claim 28, wherein those selected maximum counter values are substantially finite.

44. A physical non-transitory medium as in claim 28, wherein those selected minimum counter values are substantially nonnegative.

45. A physical non-transitory medium as in claim 28, wherein those instructions second maintaining include information interpretable by a computing device, the information including
    instructions adding messages to that set upon arrival;
    instructions removing messages from that set upon release; and
    instructions removing messages from that set upon exceeding a selected maximum number of messages.

46. A physical non-transitory medium as in claim 45, wherein that selected maximum number of messages is finite.

47. A physical medium as in 28, wherein those instructions treating include information interpretable by a computing device, the information including instructions applying distinct rules to messages in response to those instructions detecting.

48. A physical medium as in claim 47, wherein those instructions treating include information interpretable by a computing device, the information including instructions discarding packets detected to be included in selected particular application protocols.

49. A physical non-transitory medium as in claim 47, wherein those instructions treating include information interpretable by a computing device, the information including instructions discarding packets detected to not be included in selected particular application protocols.

50. A physical medium as in claim 47, wherein those instructions treating include
    instructions identifying packets between a first set of size bounds as belonging to an identified message traffic pattern,
    so long as a selected number of packets between a second set of size bounds arrived with a selected previous time interval.

51. A physical non-transitory medium as in claim 50, wherein at least one of those first set of size bounds, second set of size bounds, are constant.

52. A physical non-transitory medium as in claim 50, wherein at least one of those first set of size bounds, second set of size bounds, are time-varying.

53. A physical non-transitory medium as in claim 50, wherein that selected previous time interval is substantially constant.

54. A physical non-transitory medium as in claim 50, wherein that selected previous time interval is substantially time-varying.

55. Apparatus as in claim 28, wherein that selected distribution includes a inconstant rate per unit time, averaging a selected rate per unit time.

56. Apparatus as in claim 28, wherein that selected distribution includes at least one of: a Poisson arrival distribution, a Bernoulli arrival distribution, another nonlinear arrival distribution.

57. Apparatus including a computing device, the computing device including
    component determining a set of message pattern features;
    component detecting one or more application protocols in response to those message pattern features;
    component treating one or more packets included in those application protocols in response to those means for detecting;
    component detecting more and more application protocols in response to inspection of packets; and
    wherein that computing device treating is responsive to those instructions detecting in response to inspection of packets;

wherein that computing device detecting includes
component maintaining a counter of messages expected to arrive within a first known time duration;
component maintaining a set of messages actually arriving within a second known time duration, that second known time duration being responsive to that first known time duration; and
a comparator coupled to that counter of messages and that set of messages,
wherein that component maintaining a counter includes
a counter incrementor operating according to a selected distribution, between first selected minimum and maximum counter values; and
a counter decrementor operating each time a message is released from that queue, between second selected minimum and maximum counter values;
a selected mapping between that incrementor and that decrementor.

58. Apparatus as in claim 57, wherein that set of message pattern features includes at least one of: rate, burstiness, accumulation, size parameters.

59. Apparatus as in claim 57, wherein that logic detecting include
logic identifying whether message traffic adheres to a selected set of message pattern features;
logic indicating whether one or more packets are included in a set of particular application protocols, in response to that logic identifying.

60. Apparatus as in claim 57, wherein that logic detecting includes
logic identifying whether message traffic adheres to a selected set of message pattern features;
logic indicating whether one or more packets are not included in a set of particular application protocols, in response to those means for identifying.

61. Apparatus as in claim 28, wherein that comparator includes component matching a first number of those counters with a second number of those messages.

62. Apparatus as in claim 57, including logic releasing those messages in response to an output of that comparator.

63. Apparatus as in claim 57, wherein that selected mapping between that incrementor and that decrementor includes a one-to-one mapping between incoming tokens and released packets.

64. Apparatus as in claim 57, wherein that selected mapping between that incrementor and that decrementor includes a mapping between incoming tokens and released packets that is responsive to an amount of time it would take to transmit each such packet.

65. Apparatus as in claim 57, wherein that selected mapping between that incrementor and that decrementor includes a mapping between incoming tokens and released packets that is responsive to a linear function of an amount of time it would take to transmit each such packet.

66. Apparatus as in claim 57, wherein that selected mapping between that incrementor and that decrementor includes a mapping between incoming tokens and released packets that is responsive to a size of each such packet.

67. Apparatus as in claim 57, wherein that selected mapping between that incrementor and that decrementor includes a mapping between incoming tokens and released packets that is responsive to a linear function of a size of each such packet.

68. Apparatus as in claim 57, wherein that selected distribution includes a constant rate per unit time.

69. Apparatus as in claim 57, wherein those first and second selected counter values are identical.

70. Apparatus as in claim 57, wherein those selected maximum counter values are finite.

71. Apparatus as in claim 57, wherein those selected minimum counter values are nonnegative.

72. Apparatus as in claim 57, wherein that component maintaining a set of messages includes
component adding messages to that set upon arrival;
component removing messages from that set upon release; and
component removing messages from that set upon exceeding a selected maximum number of messages.

73. Apparatus as in claim 72, wherein that selected maximum number of messages is finite.

74. Apparatus as in claim 73, wherein that logic treating includes logic applying distinct rules to messages in response to that logic detecting.

75. Apparatus as in claim 74, wherein that logic treating includes logic discarding packets detected to be included in selected particular application protocols.

76. Apparatus as in claim 74, wherein that logic treating includes logic discarding packets detected to not be included in selected particular application protocols.

77. Apparatus as in claim 75, wherein that logic treating includes
logic identifying packets between a first set of size bounds as belonging to an identified message traffic pattern,
so long as a selected number of packets between a second set of size bounds arrived with a selected previous time interval.

78. Apparatus as in claim 77, wherein at least one of those first set of size bounds, second set of size bounds, are constant.

79. Apparatus as in claim 77, wherein at least one of those first set of size bounds, second set of size bounds, are time-varying.

80. Apparatus as in claim 77, wherein that selected previous time interval is constant.

81. Apparatus as in claim 77, wherein that selected previous time interval is time-varying.

* * * * *